United States Patent [19]
Schutz et al.

[11] 4,170,446
[45] Oct. 9, 1979

[54] PLASTICS-PROCESSING MACHINE

[75] Inventors: Gerhard Schütz; Rolf Kocher, both of Winterthur, Switzerland

[73] Assignee: Sulzer Brothers Limited, Winterthur, Switzerland

[21] Appl. No.: 789,190

[22] Filed: Apr. 20, 1977

[30] Foreign Application Priority Data

Apr. 29, 1976 [CH] Switzerland .................... 5381/76

[51] Int. Cl.$^2$ .................................................. B29B 1/06
[52] U.S. Cl. ..................................... 425/199; 264/329; 366/80; 366/87; 366/337
[58] Field of Search ............... 259/4 R, 4 AB, 4 AC, 259/191, 192, 193, 4 A; 425/382.2, 378 S, 205, 199, 197, 542; 264/329; 366/87, 80, 337

[56] References Cited

U.S. PATENT DOCUMENTS

| | | | |
|---|---|---|---|
| 3,792,839 | 2/1974 | Gidge | 259/4 AB |
| 3,871,624 | 3/1975 | Schutz | 259/4 AB |
| 3,923,288 | 12/1975 | King | 259/4 AB |
| 4,093,188 | 6/1978 | Horner | 366/337 |

*Primary Examiner*—Robert W. Jenkins
*Attorney, Agent, or Firm*—Kenyon & Kenyon

[57] ABSTRACT

The plastics processing machine employs a mixer which has a static mixing device formed of at least one insertion member composed of guide elements in layers which form flow channels. The hydraulic diameter $d_h$ is made no more than eight millimeters (8 mm) in order to obtain a high mixing quality. The hydraulic diameter may vary along the mixer, for example by decreasing from the inlet end to the outlet end.

14 Claims, 6 Drawing Figures

PLASTICS-PROCESSING MACHINE

This invention relates to a plastics-processing machine. More particularly, this invention relates to a plastics-processing machine such as an injection molding machine or an extruder.

As is known, numerous types of plastics-processing machines have been known for producing of plastic parts. In order to meet increasing quality requirements, use has been made of static mixing devices within such machines in order to supply homogeneous plastics melts of satisfactory quality. For example, use has been made of static mixing devices as described in Swiss Pat. Nos. 547,120 and 464,860, German Offenlegungsschrift No. 2,328,795 and U.S. Pat. Nos. 3,785,620 and 3,918,688. Generally, these static mixing devices are disposed in tubular jackets and are composed of guide elements which are disposed in layers to form flow channels for the throughput.

In spite of the aforementioned advantages of the static mixing devices, there has been a disinclination to use them in plastics-processing machines. One reason is that the static mixing devices produce high pressure losses which adversely effect the throughput. That is, the high pressure losses produce high local shearing forces which, in turn, result in local overheating and damaging of the products.

In order to avoid the presumed disadvantages of using static mixing devices in plastics-processing machines, it has been known to substantially reduce the pressure drop in the mixing devices by adopting suitable procedures. For example, use has been made of very low flow rates and very large hydraulic diameters in the mixing devices. The hydraulic diameter $d_h$ of a mixing device is defined as follows:

$$d_h = \frac{4 \times \text{free volume of mixing device}}{\text{wetted surface of mixing device}}$$

The "free volume of the mixing device" defines the free throughput volume between the tubular jacket and the individual guide elements whereas the wetted surface is made up of the surfaces of the guide elements and the inner tubular jacket of the mixer.

However, static mixing devices which have a large hydraulic diameter are particularly unsuitable for difficult mixing operations, such as for mixing components having greatly different viscosities. This particularly applies to the liquid dyeing of plastics.

Accordingly, it is an object of the invention to provide a plastics-processing machine with a static mixing device which is able to produce high quality products.

It is another object of the invention to provide a plastics-processing machine which is able to produce high quality products for injection molding or for extrusions.

It is another object of the invention to provide a static mixing device which provides a pressure loss which does not adversely effect the throughput.

It is another object of the invention to provide a static mixing device having a variable hydraulic diameter.

Briefly, the invention provides a plastics-processing machine which comprises a mixer composed of a tubular jacket and a static mixing device within the jacket having a hydraulic diameter of not more than eight millimeters (8 mm). In addition, the mixing device includes at least one insertion member composed of guide elements disposed in layers which form flow channels for a plastic flow; the flow channels of adjacent layers being inclined relative to one another. These guide elements subtend an angle less than ninety degrees relative to the jacket with the flow channels of adjacent layers disposed in intersecting relation.

It has been surprisingly found and experimentally confirmed that the pressure drop in static mixing device can easily be tolerated where the mixing devices have hydraulic diameters of eight millimeters (8 mm) or less. A particularly high mixing quality, resulting in a satisfactory product, can be obtained where the hydraulic diameter has a constant value of from 2 to 4 millimeters along the entire length of the mixing device.

The plastics-processing machine may be of the type which employs a casing having a rotatable screw for feeding the flow of plastic in a given flow direction with the mixer secured in alignment with the casing and with a nozzle secured to an outlet end of the mixer for extruding the plastic flow. Such a machine may be used for extrusions. In another type of machine, an injection mold is disposed adjacent to the nozzle for receiving an extruded charge of plastic for purposes of injection molding.

Experiments on the entire system of a plastics-processing machine of the injection molding type have shown that the pressure drop in the region extending from the feed casing to the injection mold is even lower than in plastics-processing machines not using static mixing devices. The probable reason is that the average viscosity of the processed material is reduced by the additional shearing forces of the mixing device. In addition, the homogenizing action eliminates differences in viscosity between the tubular wall of the mixer and the interior of the tube. This, likewise, reduces the aveage viscosity.

In one particular embodiment, the static mixing device is constructed with a plurality of insertion members and has a hydraulic diameter which varies, for example, by decreasing from the plastics inlet end to the outlet end. This feature is advantageous since the plastics being processed is roughly distributed in a first insertion member having a relatively large hydraulic diameter and then finely mixed in a downstream insertion member having a smaller hydraulic diameter.

These and other objects and advantages of the invention will become more apparent from the following detailed description and appended claims taken in conjunction with the accompanying drawings in which:

Figure 1:
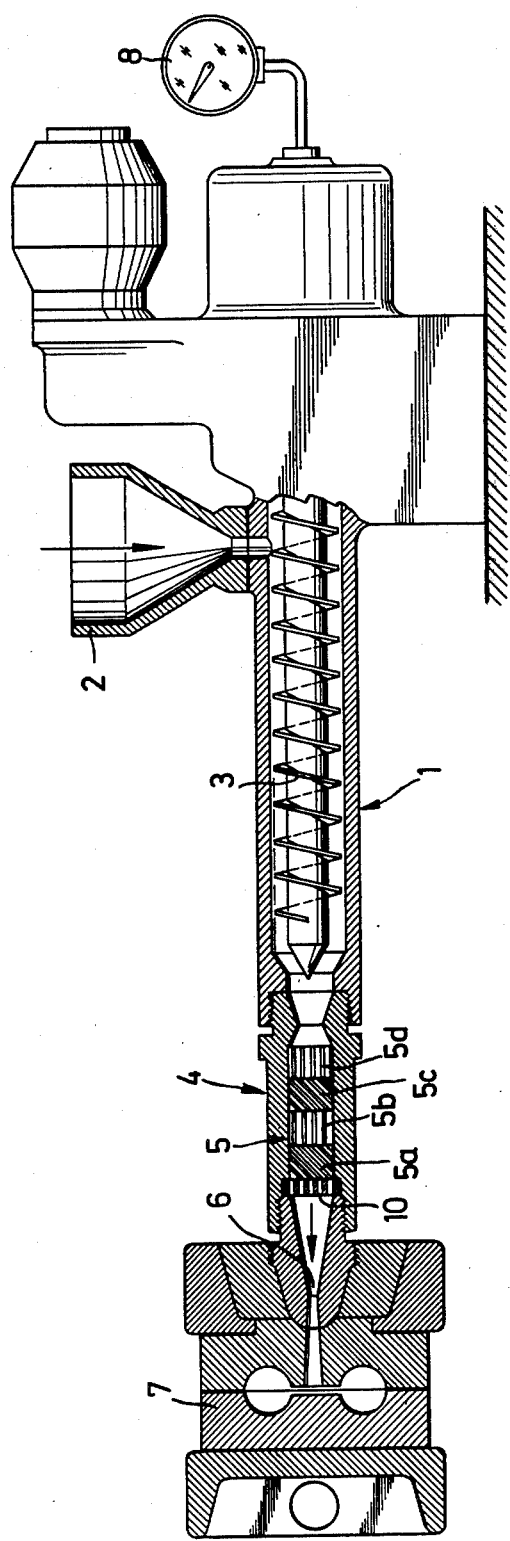
FIG. 1 illustrates a diagrammatic longitudinal sectional view through an injection molding machine employing a static mixing device according to the invention.

Referring to FIG. 1, the plastics-processing machine 1 employs a feed funnel 2 for a plastics which is to be processed, for example, by the addition of a liquid dye.

In addition, the machine has a casing in which a rotatable screw 3 is mounted for feeding and plasticizing a flow of plastic in a given flow direction from the funnel 2. Such constructions are well known and need no further description. In addition, the machine has a mixer 4 secured in alignment with the casing and a nozzle 6 threadably secured to an outlet end of the mixer 4 for extruding a plastic flow. In addition, an injection mold 7 is positioned adjacent to the nozzle 6 for receiving an extruded charge of plastic and a suitable pressure guage is connected to the machine 1.

Referring to FIG. 1, the mixer includes a tubular jacket having a cylindrical wall 4' as well as an inlet end to receive a flow of plastics from the feed casing and an outlet end to discharge the flow of plastics to the nozzle 6. In addition, a static mixing device is disposed within the tubular jacket for mixing the plastics flow. This mixing device comprises four insertion members 5a–5d disposed longitudinally of the tubular casing. The insertion members 5a–5d are of identical construction and are composed of guide elements disposed in layers to form flow channels for the plastics flow; the flow channels of adjacent layers being inclined relative to one another. These guide elements subtend an angle less than ninety degrees relative to the jacket axis with the flow channels of adjacent layers disposed in intersecting relation. As indicated in FIG. 1, the layers of successive insertion members 5a–5d are offset from one another by an angle of 90°.

Figure 3:
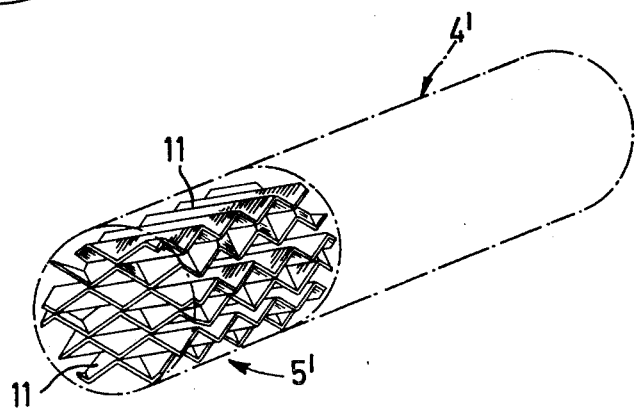
FIG. 3 illustrates one embodiment of a static mixing device for use in the mixer of FIG. 2.

Referring to FIG. 3, each insertion member may be particularly composed of layers 11 of corrugated plates disposed in contiguous relation.

Figure 4:
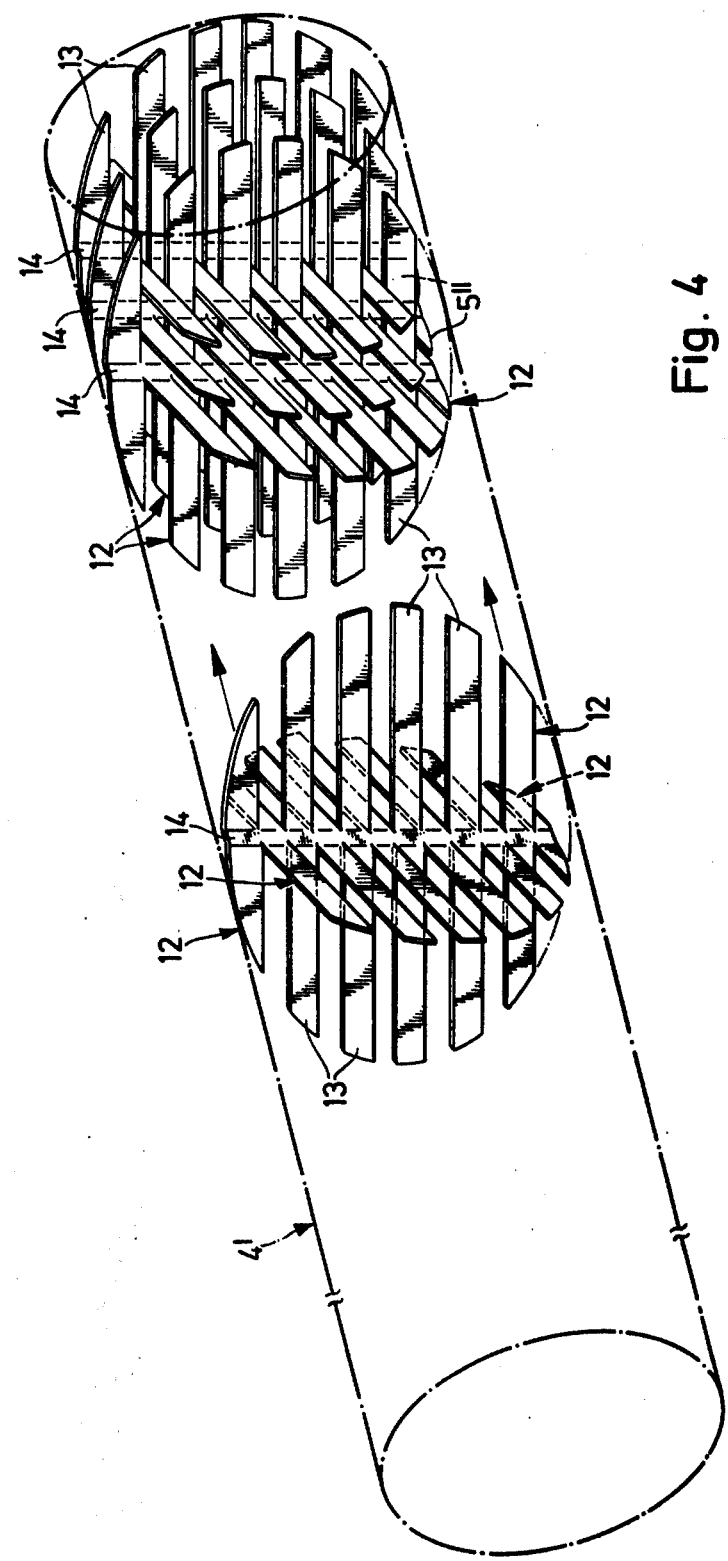
FIG. 4 illustrates another embodiment of a static mixing device for use in a mixer according to FIG. 2.

Referring to FIG. 4, each insertion member may alternatively be composed of at least one pair of plates 12 having webs 13 at an angle to each other and to the axis of the jacket of the mixer. As illustrated, the plates 12 are forked and engage one another to form a gable-like edge at right angles to the axis of the jacket. That is, the webs 13 are disposed on a common connecting web 14 which extends at right angles to the longitudinal axis of the webs and at an angle through the tubular cross-section of the mixer. Thus, the webs 13 form a single component with the flow channels formed by the webs 13 extending to the inner tubular wall 4' of the mixer.

Figure 2:
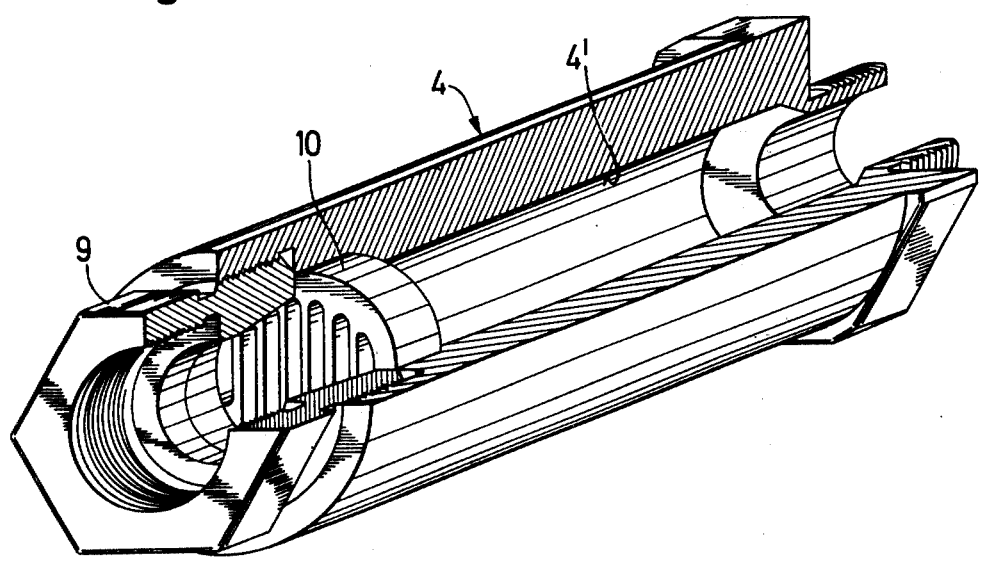
FIG. 2 illustrates a perspective view of a part of a mixer employed in the machine of FIG. 1.

Referring to FIG. 1, the insertion members 5a–5d are retained in place within the tubular casing by means of a holder 10. As shown in FIGS. 1 and 2, the holder 10 is provided with suitable apertures for the flow of the mixed plastic. As also shown in FIG. 2, instead of threading the nozzle 6 directly to the mixer 4, use may be made of a threaded nut 9 for attaching the nozzle 6 to the mixer 4.

Figure 5:
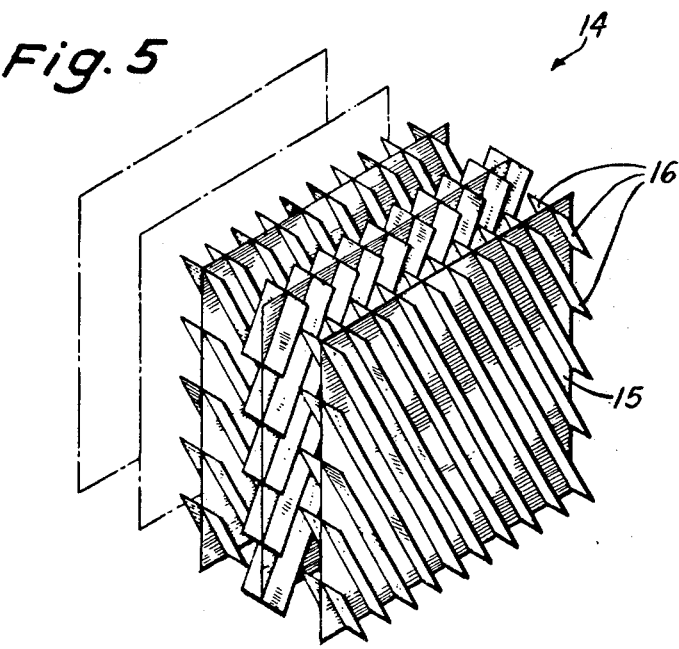
FIG. 5 illustrates a perspective view of another embodiment of a static mixing device for use in the mixer of FIG. 2 in accordance with the invention.
Figure 6:
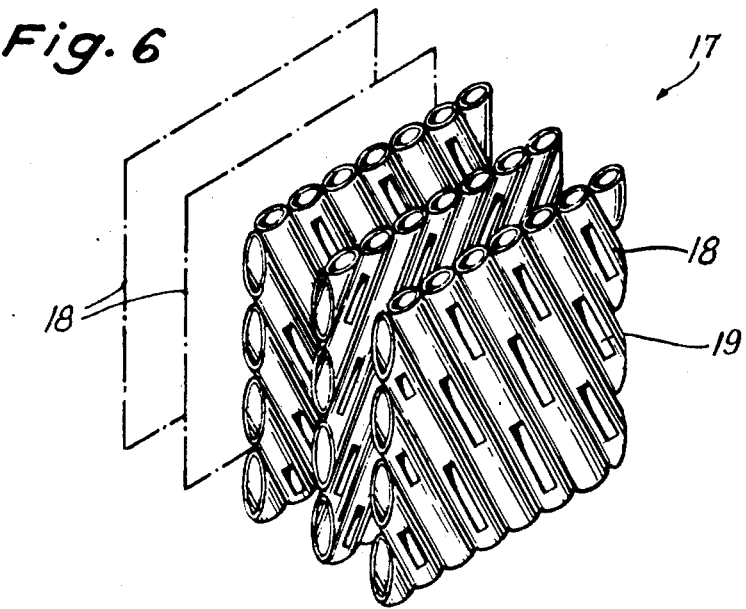
FIG. 6 illustrates another embodiment of a static mixing device for use in a mixer according to the invention.

It is to be noted that other types of static mixing devices may also be disposed within the mixer 4. For example, one mixing device 14 may be made of insertion members of layered construction wherein the layers are flat elements connected to approximately parallel flat guide elements (FIG. 5). In this case, the flat elements 15 form an angle with the flat guide elements 16 to define individual flow channels bounded by the flat elements 15 and pairs of adjacent guide elements 16 (see U.S. Pat. No. 3,871,624, FIG. 1). In another embodiment (FIG. 6) the mixing device 17 comprises layers which are tube banks, these tube banks are in contact with each other and each tube bank has a plurality of tubes 18 disposed in contiguous relation, wherein the tubes 18 are provided with apertures 19 longitudinally thereof (see U.S. Pat. No. 3,871,624, FIG. 2). In another embodiment wherein the mixing device comprises at least one pair of plates having webs at an angle to each other and to the axis of the jacket, the plates may be bent to abut in the middle of the jacket in order to form a gable-like edge at right angles to the jacket axis (see German Offenlegungsschrift No. 2,522,106, FIG. 3). Still further, the mixing device may be comprised of a plurality of comb-like plates which are disposed in two rows. In this case, the plates have webs with the webs of each two layers in one row intersecting the webs of at least one layer in the other row (see German Offenlegungsschrift No. 2,328,795, FIG. 15).

Still further, the static mixing device may be permanently disposed within the mixer of a machine in a stationary manner.

The common feature of the various mixing devices is that they each have a hydraulic diameter of not more than eight millimeters (8 mm). In some cases, the hydraulic diameter may be of a constant value throughout the entire length of the mixing devices, such as between two and four millimeters or the hydraulic diameter may vary, for example by decreasing from the inlet end of the mixer 4 to the outlet end to the nozzle 6. This is particularly of advantage where a number of insertion members are used. In this case, the first insertion members may have a relatively large hydraulic diameter while the downstream insertion members have a smaller hydraulic diameter.

The invention thus provides a plastics-processing machine which utilizes static mixing devices which are able to provide high quality products without inordinately high pressure losses in processing.

What is claimed is:

1. A plastics-processing machine comprising
a mixer having a tubular jacket disposed on an axis and a static mixing device within said jacket, said mixing device having a hydraulic diameter of not more than eight millimeters (8 mm) and including at least one insertion member composed of guide elements disposed in layers and forming flow channels, said flow channels of adjacent layers being inclined relative to one another, said guide elements subtending an angle less than ninety degrees relative to said axis with said flow channels of adjacent layers disposed in intersecting relation.

2. A plastics-processing machine as set forth in claim 1 wherein said hydraulic diameter has a constant value of between two (2) and four (4) millimeters along the length of said mixing device.

3. A plastics-processing machine as set forth in claim 1 wherein said static mixing device is permanently disposed in said machine in a stationary manner.

4. A plastics-processing machine as set forth in claim 1 wherein said mixer has a plastics inlet at one end and a plastics outlet at an opposite end, and said mixing device has a plurality of insertion members along said axis and wherein said hydraulic diameter decreases from said inlet to said outlet.

5. A plastics-processing machine as set forth in claim 1 wherein said mixing device has at least a pair of insertion members, said layers of one said insertion member being offset from said layers of the other said insertion member at an angle of up to ninety degrees (90°).

6. A plastics-processing machine as set forth in claim 1 wherein said layers are corrugated plates disposed in contiguous relation.

7. A plastics-processing machine as set forth in claim 1 wherein said layers are flat elements connected to approximately parallel flat guide elements and form an angle with said flat guide elements to define individual flow channels bounded by said flat elements and pairs of adjacent guide elements.

8. A plastics-processing machine as set forth in claim 1 wherein said mixing device comprises at least one pair of plates having webs at an angle to each other and to said axis of said jacket, wherein said plates are bent and abut in the middle of said jacket fo form a gable-like edge at right angles to said axis.

9. A plastics-processing machine as set forth in claim 1 wherein said mixing device comprises a plurality of comb-like plates disposed in two rows, said plates having webs with the webs of each two layers in one row intersecting the webs of at least one layer in the other row.

10. A plastics-processing machine as set forth in claim 1 wherein said layers are tube banks in contact with each other, each tube bank having a plurality of tubes disposed in contiguous relation, wherein said tubes are provided with apertures longitudinally thereof.

11. A plastics-processing machine comprising
a casing having a rotatable screw therein for feeding a flow of plastic in a given flow direction;
a mixer secured in alignment with said casing, said mixer including at tubular jacket having an inlet end to receive a flow of plastic from said casing and an outlet end to discharge the flow of plastic and a static mixing device within said tubular jacket for mixing the plastic flow, said static mixing device having a hydraulic diameter of not more than eight millimeters (8 mm) and havng at least one insertion member composed of guide elements disposed in layers and forming flow channels for the plastic flow, said flow channels of adjacent layers being inclined relative to one another, said guide elements subtending an angle less tha ninety degrees relative to said jacket with said flow channels of adjacent layers disposed in intersecting relation; and
a nozzle secured to said outlet end of said jacket for extruding the plastic flow.

12. A plastics-processing machine as set forth in claim 11 which further comprises an injection mold adjacent said nozzle for receiving an extruded charge of plastic therefrom.

13. A plastics-processing machine as set forth in claim 11 wherein said hydraulic diameter has a constant value of between two (2) and four (4) millimeters along the length of said mixing device.

14. A plastics-processing machine as set forth in claim 11 wherein said mixer has a plastics inlet at one end and a plastics outlet at an opposite end, and said mixing device has a plurality of insertion members along said axis and wherein said hydrualic diameter decreases from said inlet to said outlet.

* * * * *

UNITED STATES PATENT AND TRADEMARK OFFICE
CERTIFICATE OF CORRECTION

PATENT NO. : 4,170,446
DATED : October 9, 1979
INVENTOR(S) : Gerhard Schutz, et al It is certified that error appears in the above-identified patent and that said Letters Patent are hereby corrected as shown below:

Column 2, line 34, change "aveage" to --average--

Column 3, line 10, change "guage" to --gauge--

Column 5, line 9, change "fo" to --to--

Column 6, line 3, change "havng" to --having--

Column 6, line 8, change "tha" to --than--

Signed and Sealed this

Fifteenth Day of January 1980

[SEAL]

Attest:

SIDNEY A. DIAMOND

Attesting Officer

Commissioner of Patents and Trademarks